United States Patent
Bruelle-Drews

(10) Patent No.: US 7,463,975 B2
(45) Date of Patent: Dec. 9, 2008

(54) NAVIGATION SYSTEM WITH ACOUSTIC ROUTE INFORMATION

(75) Inventor: Christian Bruelle-Drews, Hamburg (DE)

(73) Assignee: Harman International Industries, Incorporated, Northridge, CA (US)

( * ) Notice: Subject to any disclaimer, the term of this patent is extended or adjusted under 35 U.S.C. 154(b) by 657 days.

(21) Appl. No.: 10/528,526

(22) PCT Filed: Feb. 24, 2003

(86) PCT No.: PCT/US03/05244

§ 371 (c)(1), (2), (4) Date: Mar. 18, 2005

(87) PCT Pub. No.: WO2004/076975

PCT Pub. Date: Sep. 10, 2004

(65) Prior Publication Data

US 2006/0031009 A1 Feb. 9, 2006

(51) Int. Cl.
*G01C 21/30* (2006.01)

(52) U.S. Cl. ............ 701/209; 701/208; 701/211; 701/212; 340/995.1

(58) Field of Classification Search ............. 701/200, 701/201, 208, 209, 211, 212, 213; 340/990, 340/995.1

See application file for complete search history.

(56) References Cited

U.S. PATENT DOCUMENTS

| 5,587,911 A | 12/1996 | Asano et al. |
| 5,787,383 A | 7/1998 | Moroto et al. |
| 6,282,464 B1 | 8/2001 | Obradovich |
| 6,298,303 B1 | 10/2001 | Khavakh et al. |
| 2001/0007090 A1 | 7/2001 | Irie et al. |

FOREIGN PATENT DOCUMENTS

| EP | 1 099 932 A1 | 5/2001 |
| JP | 2000-311177 | 11/2000 |
| JP | 2001-141505 | 5/2001 |
| JP | 2002-221433 | 8/2002 |
| JP | 2002-310710 | 10/2002 |
| WO | WO 00/71975 A1 | 11/2000 |

OTHER PUBLICATIONS

Patent Cooperation Treaty International Search Report, PCT/US03/05244, filed Feb. 24, 2003.

*Primary Examiner*—Gertrude Arthur Jeanglaud
(74) *Attorney, Agent, or Firm*—Brinks Hofer Gilson & Lione

(57) ABSTRACT

A navigation system (100) capable of providing acoustic route information summarizing a route to a predetermined destination. The navigation system (100) includes a route calculation module (110) that is capable of calculating a route to a trip destination. A route overview module (104) may also be included for creating a route overview list that is based on the route. An acoustic message module (108) may be used to generate at least one acoustic route overview message as a function of the route overview list associated with the route.

38 Claims, 4 Drawing Sheets

NAVIGATION SYSTEM WITH ACOUSTIC ROUTE INFORMATION

BACKGROUND OF THE INVENTION

1. Technical Field

This invention relates generally to vehicle navigation systems and, more particularly, to generating acoustic route information in a vehicle navigation system.

2. Related Art

Vehicle navigation systems are becoming increasingly popular in the automobile industry. A typical vehicle navigation system includes a global positioning system ("GPS") receiver that is mounted somewhere on the vehicle. The GPS receiver is capable of communicating with a satellite-based global positioning system or other localized positioning systems. The GPS receiver obtains position information that is converted into some form of display for the vehicle operator indicating the position of the vehicle relative to previously determined reference points or other known landmarks in a given map database.

The typical vehicle navigation system also includes a digital map database module that includes digitized map information that can be processed by a navigation computer designed to handle map-related functions. A map matching module is used to match the position or trajectory measured by a positioning module to a position associated with a location or route on a map provided from the digital map database. The positioning module receives its information from the GPS receiver.

A route planning module is also typically included that is used to help vehicle drivers plan a route prior to or during a trip. A commonly used technique is to find a minimum-travel-cost route, which is designed to minimize the amount of distance traveled and costs associated with reaching a predetermined destination. A route guidance module is also included that is used to guide the driver along the route generated by the route planning module. Guidance can be given, either before the trip, or in real time while en-route. The real time or en-route guidance is typically generated using optical driver recommendations and/or acoustic driver recommendations.

The typical vehicle navigation system also includes a human-machine interface module that provides users with a way to interact with the location and navigation computer and devices. A visual display is typically used to convert signals into a visual image in real time for direct interpretation by the user. As such, displays are used to provide the optical driver recommendations. The display itself is typically an electro-optical device such as a liquid crystal display ("LCD"), a cathode-ray tube ("CRT") display, an electroluminescent display ("ELD"), a heads-up display ("HUD"), a plasma display panel ("PDP"), a vacuum fluorescent display ("VFD"), or a touch-screen display.

The human-machine interface module may also include a voice-based interface that allows the user to interact with vehicle navigation system. The acoustic driver recommendations are provided using the voice-based interface. Speech is the most common interface that is used for delivering acoustic driver recommendations because it provides a natural interface that does not distract the driver from operating the vehicle and paying attention to the roadway. As such, information provided through acoustic driver recommendations may be safer because it allows the vehicle operator to concentrate on the task of driving.

Travelers using a subway or railway station are typically provided with a short information message about the time of departure and the route of the train. Existing navigation systems for vehicles currently do not provide this functionality. Drivers can ascertain the anticipated time of arrival, the distance to be traveled and the computed route, but the user is not provided with a comprehensive overview of the entire route to be taken. As such, this information does not give the driver any possibility of preparing himself/herself for the route being traveled.

Some navigation systems provide visual route lists that contain all of the official road names of the roads along the route to be taken. Drivers who are not familiar with the surroundings are not in a position to derive even a rough sketch of the route based on the visual route list. The direction of the route must therefore be figured out on a map. Although a map illustration provides a good overview of the direction of the route, it does require the capacity to abstract. Generally, the displays that are used in navigation systems are too small to depict the names of town parts or road structures. As such, a need exists for a way to provide drivers with an overview of the route being taken to reach a predetermined destination.

A navigation system capable of providing an acoustic route overview message summarizing a route to a predetermined destination is disclosed. The navigation system includes a route calculation module, a route overview module and an acoustic message module. The route calculation module is used to calculate a route to the predetermined destination. The route overview module is used to create a route overview list that is based on the route to be traveled to reach the destination. The acoustic message module is operable to generate an acoustic route overview message based on the route overview list that is associated with the route. The acoustic route overview message is an audible summary of the route to be taken by the vehicle to reach the predetermined destination.

Once the acoustic message module generates the acoustic route overview message, it is audibly reproduced on at least one loudspeaker that is located in the vehicle. The acoustic route overview message is output in response to a request for a route overview that is entered by a user. The request for the route overview may be entered by pressing a button, by setting an option, or by audibly requesting a route overview. The route overview list that is generated by the route overview module may include at least one item that may be selected from a group of items including a street name on the route, a name of a place on the route, a via on the route, a city on the route, an alternative street name on the route, a business location on the route, and a landmark on the route.

The acoustic route overview message may be limited to a predetermined amount of time. The route overview list may be shortened based on a variety of weighting factors to fit within the predetermined amount of time. The weighting factor may be a function of a popularity ranking that may be associated with each item contained in the route overview list. The more popular an item is in the list the less likely it will be eliminated from the list. The predetermined weighting factor may also be based on a length of a road segment to be traveled on the route. The longer the road segment is the less likely that particular road segment will be eliminated from the acoustic route overview message. The acoustic route overview message may also include an anticipated time of arrival that is placed in the message by the acoustic message module.

The navigation system may also be designed in the form of a server-based solution. A navigation control unit may be connected to a navigation server by using a wireless access device. The wireless access device transmits data to and from the navigation control unit to the navigation server. The route to be traveled to reach the destination, the route overview list and the acoustic route overview message may all be accomplished on the navigation server. The navigation server performs most of the computing tasks and stores a map database and an acoustic message database that are used during operation.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
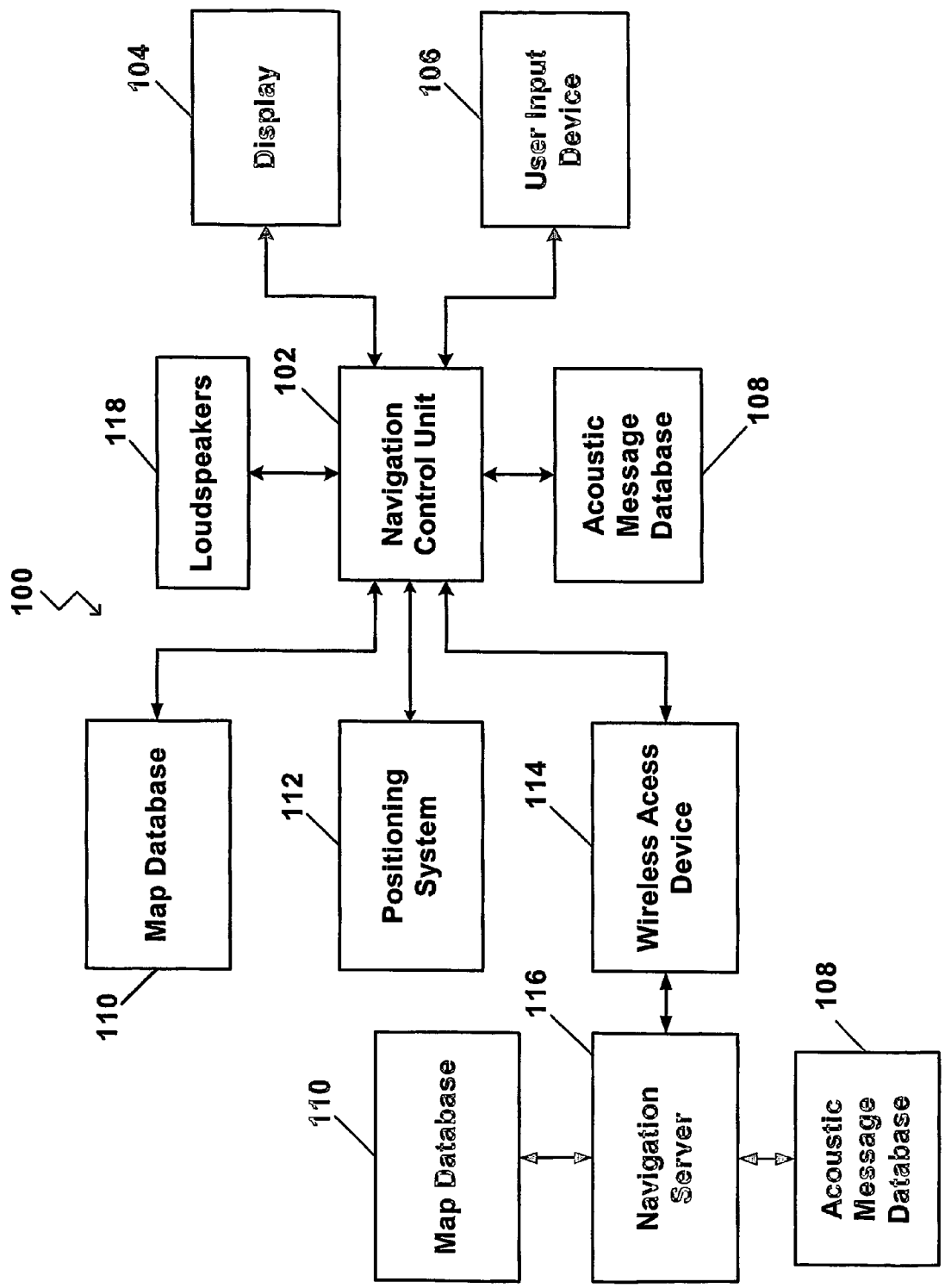
FIG. 1 is a block diagram of a vehicle navigation system.

Referring to FIG. 1, a navigation system 100 capable of providing acoustic route information is disclosed. As illustrated, the navigation system 100 includes a navigation control unit 102 that includes software modules programmed to calculate routes from points of origin to predetermined destinations. Although not specifically illustrated, the navigation control unit 102 may include a Central Processing Unit ("CPU"), a system bus, a Random Access Memory ("RAM"), a Read Only Memory ("ROM"), an I/O adapter for connecting peripheral devices such as hard disc drives, CD-ROM drives, a communications adapter, and a display adapter. Those skilled in the art should recognize that various computing devices may be used as the navigation control unit 102.

The navigation control unit 102 may be connected with a display 104. The display 104 may be a touch-screen display that can function as both a display and a user input device. The navigation control unit 102 may be connected with a user input device 106. The user input device 106 may be a keypad, buttons, knobs, a personal computer, a laptop computer, a pocket PC, a personal digital assistant, a wireless access device or phone, or any other type of computing device that is capable of allowing a user of the navigation system 100 to input data during operation.

If the user input device 106 communicates wirelessly with the navigation control unit 102, both the navigation control unit 102 and the user input device 106 may be connected with a wireless communication device that is capable of passing the necessary data back and forth between the user input device 106 and the navigation control unit 102. Some illustrative methods of connecting the user input device 106 with the navigation control unit 102 that may be used include infrared, Bluetooth, wireless LAN, Universal Serial Bus, fiber optic, direct wire, parallel ports, serial ports, and a network connection.

The navigation system 100 also includes an acoustic message database 108. The acoustic message database 108 is connected to the navigation control unit 102. The acoustic message database 108 includes a plurality of acoustic messages that may fall within any one of a number of categories. The acoustic messages may be stored on a hard disc storage device, a CD-Rom, or any other suitable storage medium. The acoustic messages may include street/road names and numbers, motorway names and numbers, highway names and numbers, via identifiers, city names, town names, town center names, town part names, alternative street/road names, landmark names, famous structure names, building names, traffic information messages, and business names (e.g.—restaurants, hotels, shopping centers and so forth). For the purpose of the present invention, all of the above-mentioned acoustic messages may be called route information points.

As further illustrated, the navigation control unit 102 may be connected to a map database 110. The map database 110 may be located on a hard disc storage device, a CD-Rom, or any other suitable storage medium. The map database 110 contains a digital map of a road network for various geographic locations as well as other types of data. The map database 110 allows the navigation control unit 102 to display a map of a geographic location including road networks. The navigation control unit 102 can help locate an address or destination using a street address or nearby intersections, can help calculate a travel route, can match sensor-detected vehicle trajectory with a known road network to determine more accurately the actual position of the vehicle; or provide travel information such as travel guides, landmarks, hotel and restaurant information.

The navigation control unit 102 may also be connected to at least one positioning system 112. The positioning system 112 may be used to determine the geographic location or coordinates of the vehicle, as well as the trajectory of the vehicle. Positioning involves the determination of the geo-coordinates of the vehicle on the surface of the Earth. Knowing the position of the vehicle allows the navigation control unit 102 to determine the precise position of the vehicle relative to a road network map. The navigation control unit 102 is also able to provide maneuvering instructions to the driver of the vehicle by knowing the geographic location of the vehicle.

Three types of positioning systems 112 that may be used include a stand-alone system, a satellite-based system, and a terrestrial radio based system. A dead reckoning system is an illustrative stand-alone system that may be used by the disclosed navigation system. A satellite-based system that may be used involves equipping the vehicle with a global positioning system ("GPS") receiver or any other type of system that uses satellites to determine geographic locations. A terrestrial radio based system is a system that uses measurement techniques to determine the location of the vehicle. Three commonly used measurement techniques for terrestrial positioning are estimated time of arrival ("ETA"), direction of arrival ("DOA"), and time difference of arrival ("TDOA"). A combination of all of the above-referenced positioning systems, as well as others, may be used in the disclosed navigation system 100.

A wireless access device 114 may be connected with the navigation control unit 102. The wireless access device 114 may be operable to connect the navigation control unit 102 with a navigation server 116. Route calculation and data storage may be accomplished by the navigation server 116. This represents a server-based solution in which the majority of the processing occurs at the navigation server 116 as opposed to the navigation control unit 102 of the vehicle navigation system 100. The navigation control unit 102 logs into the navigation server 116 using the wireless access device 114 and a wireless data transmission protocol (such as WAP) may be used to transmit data and route planning information generated by the navigation server 116 to the navigation control unit 102.

The navigation server 116 may be connected to the acoustic message database 108 and the map database 110. As such, during operation the data stored in these respective databases may be retrieved by the navigation server 116. This would eliminate the need for the navigation system 100 in the vehicle to retain such data. For example, the driver of the vehicle would not be responsible for ensuring that the proper CD-Rom was placed in the navigation system 100 for the particular geographic location in which he or she is traveling. Although illustrated separately, the acoustic message database 108 and the map database 110 may be stored in or on the same storage medium.

The navigation control unit 102 may also be connected with a plurality of loudspeakers 118. The loudspeakers 118 may be used to generate audible sounds that are produced for the benefit of the driver, such as driving directions. In addition, the loudspeakers 118 may be used to play music or any other type of audible sound. As set forth in greater detail below, for the purpose of the present invention the loudspeakers 118 are used to audibly reproduce an acoustic overview of the route to be taken to reach a predetermined destination.

Figure 2:
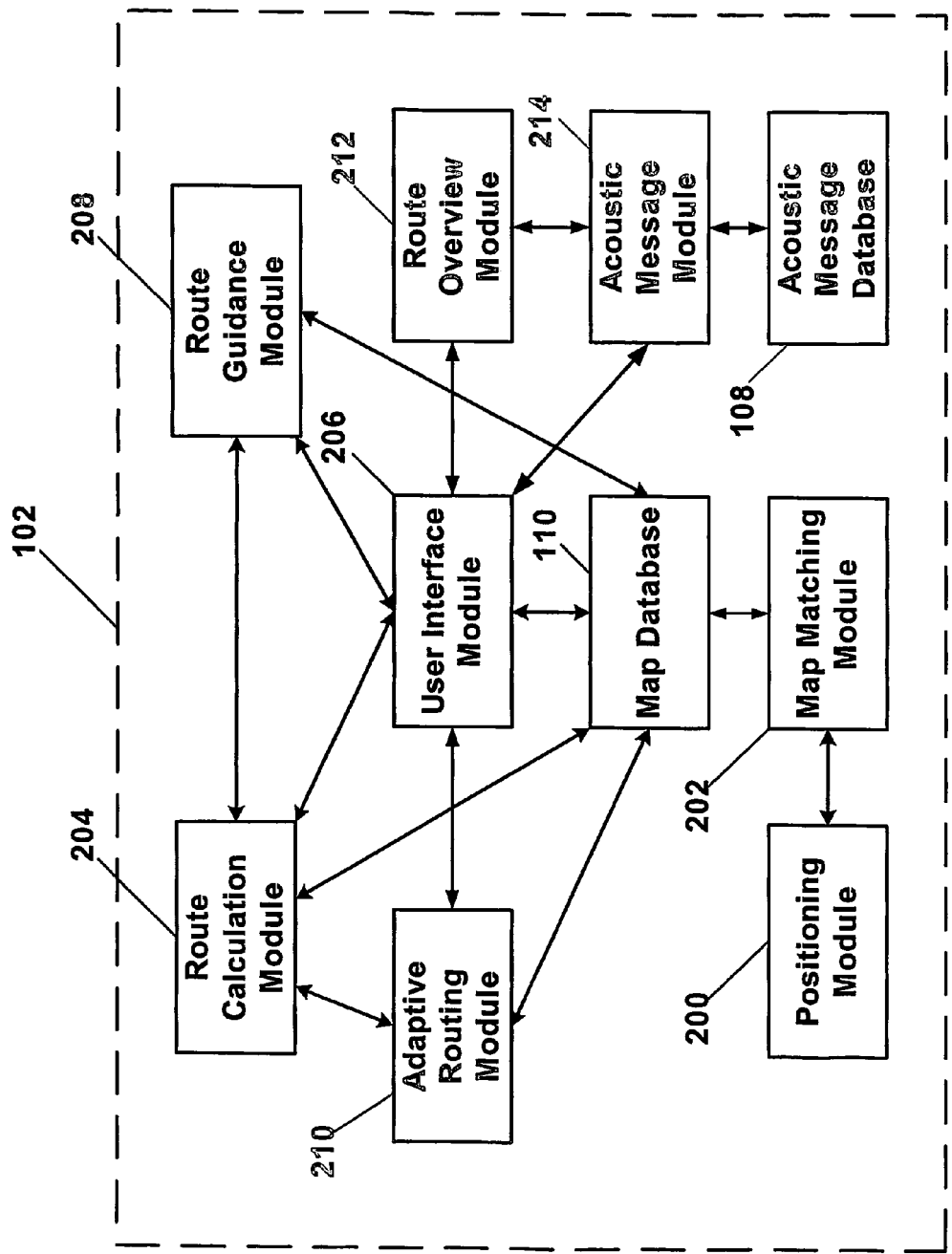
FIG. 2 is a block diagram of application modules located on the navigation system.

Referring to FIG. 2, the navigation control unit 102 includes a digital map database 110. The digital map database 110 contains map information in a predefined format that may be capable of being read and used by the navigation control unit 102 or the navigation server 116. The navigation control unit 102 is capable of using the map information for map related functions such as identifying and providing locations, road classifications, road names, traffic regulations, and travel information. The map database 110 also preferentially contains road network maps of various geographic locations. The road network maps include nodes/vias and segments that make up road networks that are used by vehicles to travel to predetermined destinations. The map database 110 may also contain hierachial "weight" information about streets (street class), highways (highway class), buildings (importance), town names (town size) as well as other weight factors about different items that may be contained in the map database 110. As set forth in detail below, this information is used to calculate a weighting factor and to shorten a route overview list.

A positioning module 200 may be included on the navigation control unit 102 that is operable to determine the geographic location and trajectory of the vehicle using the positioning system 112. As set forth above, several different positioning systems 112 may be used to determine the trajectory and geographic position of the vehicle. The positioning module 200 may include an integration algorithm that takes output signals generated by various positioning systems 112 to determine the precise geographic location and trajectory of the vehicle.

Once the geographic location and trajectory of the vehicle have been determined, a map matching module 202 may be used to match the geographic location of the vehicle with a position on the road network map generated with the map database 110. A map-matching algorithm of the map matching module 202 may be used to place the vehicle in the proper location on the road network map. The map matching module 202 is capable of correlating the vehicle position and trajectory as a function of inputs from various positioning systems 112 to the road network map by comparing the vehicle trajectory and location with the routes present in the map database 110.

The navigation control unit 102 may also include a route calculation module 204. Route calculation is the process of planning a route prior to or during a trip to a predetermined destination. The route calculation module 204 may use a shortest path algorithm to determine a recommended route from a trip origin to a trip destination. In the server-based solution, the navigation server 116 may include the route calculation module 204. Those skilled in the art of vehicle navigation systems would recognize that several different shortest path algorithms and variations of shortest path algorithms may be used in the navigation system 100 and is beyond the scope of the present invention.

The shortest path algorithm may also include a route optimization module that uses planning criteria to plan the route. The quality of any given route may depend on many factors and selection criteria such as distance, road types, speed limits, location, number of stops, number of turns and traffic information. The route selection criteria can either be fixed at manufacture or may be implemented through a user interface module 206. Determination of the best route may use the selection criteria and a digital road network map retrieved from the map database 110 to minimize distance and travel time.

As illustrated in FIG. 2, the navigation control unit 102 may also include a user interface module 206. The user interface module 206 may be operable to generate a graphical user interface ("GUI") on the display 104. The user interface module 206 may also be operable to allow a user to interact with the navigation system 100 and enter inputs into the navigation system 100. The user interface module 206 may receive inputs from the display 104 if it is a touch-screen display. The user input device 106 may also be used to enter inputs into the user interface module 206. The user inputs may be transmitted to the route calculation module 204.

The navigation control unit 102 may also include a route guidance module 208. The route guidance module 208 may be used to guide the driver along the route generated by the route calculation module 204. The route guidance module 208 may use the positioning module 200, the map database 110, and the map matching module 202 to guide the driver along the route to the respective destination. The route guidance module 208 may also allow the user interface module 206 to generate a road network map GUI on the display 104 that illustrates where the vehicle is located on a road network map and the direction the vehicle is traveling.

As further illustrated in FIG. 2, the navigation control unit 102 may also include an adaptive routing module 210. The adaptive routing module 210 allows the driver of the vehicle to change or modify a calculated route based on user defined specifications. The driver of the vehicle may open or close nodes or segments of roads on a digital map, thereby allowing the driver to influence how a given route is calculated. For example, if a driver wants to avoid a certain road or segment of road, he or she may close that segment and then the adaptive routing module 210 will calculate a new route based on the user input.

The navigation control unit 102 may also include a route overview module 212. The route overview module 212 is responsible for generating a route overview list. The route overview list contains a list of items that are associated with the route to be traveled to reach a predetermined destination. The list of items that are associated with the route to be traveled, or being traveled, may include vias or nodes on the route, numbers of classified streets (motorways and highways) on the route, towns on the route, street or road names on the route, alternative road names on the route, names of places on the route, landmarks on the route, and business locations on the route. The route overview list is a general survey or summary of the route to be traveled. As such, the route overview list is an overview of the path that the vehicle will travel to reach the designated destination.

The navigation control unit 102 may also include an acoustic message module 214. Once the route overview list has been generated, the acoustic message module 214 may be responsible for generating an acoustic route overview message that may be played to the driver using the loudspeakers 118. The acoustic message module 214 may use the acoustic message database 108 to generate the acoustic overview message. The acoustic route overview message is generated as a function of the route overview list that is generated by the route overview module 212. The acoustic message module 214 may use a text to speech engine to convert textual data contained in the acoustic message database 108 into audible human speech.

Figure 3:
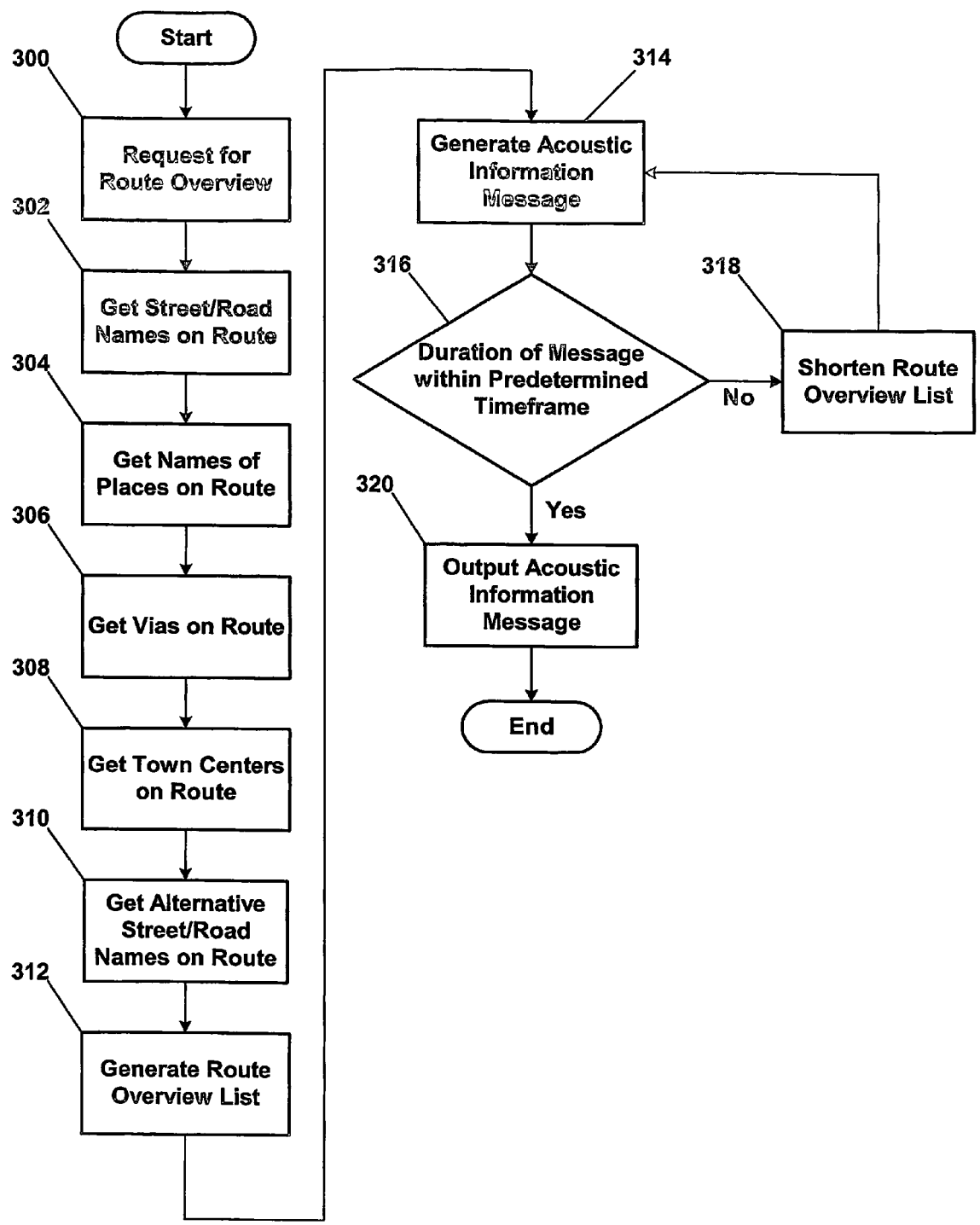
FIG. 3 is a flow chart of exemplary process steps performed to generate acoustic route overview messages on the navigation system.

Referring to FIG. 3, a block diagram of the exemplary tasks performed by the route overview module 212 and the acoustic message module 212 are illustrated. At step 300, the driver or occupant of the vehicle may enter a request for a route overview. The driver or occupant of the vehicle may enter the request for the route overview using a respective user input device 106. For example, the navigation control unit 102 may be connected with an "INFO" button on a head unit that may be used to enter a request for the route overview. Pressing the INFO button will cause the navigation control unit 102 to generate the route overview and play an acoustic message of the route overview to the occupants of the vehicle.

In response to the request for the route overview, the route overview module 212 generates a list of items associated with the route. The items that may be included, which are represented as steps 302-310 in FIG. 3, are the street or road names on the route (step 302), the names of places on the route (step 304), the vias or nodes on the route (step 306), the town centers on the route (step 308) and the alternative street or road names on the route (step 310). Although not specifically illustrated, the items on the list may also include the names of businesses on the route, the names of buildings on the route or the names of landmarks on the route. For example, if the calculated route takes the vehicle past the White House and the Lincoln Memorial in Washington, D.C., the route overview list may include these items. In addition, if the route takes the vehicle past the international headquarters for Harman International Industries, Inc. this may be included as well.

After the aforementioned items are obtained, a route overview list may be generated by the route overview module 212, which is represented as step 312. Once the route overview list is generated, at step 314 the acoustic message module 214 uses the route overview list to generate an acoustic route overview message. The acoustic message module 214 uses the route overview list to obtain acoustic messages from the acoustic message database 108 that match items contained in the route overview list. Although not specifically illustrated in FIG. 3, after the acoustic route overview message is generated it may be played or audibly reproduced on the loudspeakers 118.

As set forth above, the navigation system 100 also includes an acoustic message database 108. The acoustic message database 108 is connected to the navigation control unit 102. The acoustic message database 108 includes a plurality of acoustic messages that may fall within any one of a number of categories. The acoustic messages may be stored on a hard disc storage device, a CD-Rom, or any other suitable storage medium. The acoustic messages may include street/road names and numbers, motorway names and numbers, highway names and numbers, via identifiers, city names, town names, town center names, town part names, alternative street/road names, landmark names, famous structure names, building names, traffic information messages, and business names (e.g.—restaurants, hotels, shopping centers and so forth). For the purpose of the present invention, all of the above-mentioned acoustic messages may be called route information points.

Another feature of the navigation system 100 involves tailoring the acoustic route overview message based on predetermined criteria. As illustrated in FIG. 3, after the acoustic route overview message is generated, the acoustic message module 214 may determine if the duration of the message fits within a predetermined timeframe, which is illustrated at step 316. For example, the acoustic message module 214 may limit the duration of the acoustic route overview message to a timeframe of ten seconds.

If the acoustic route overview message does not fit within the predetermined timeframe, at step 318 the acoustic message module 214 may shorten the route overview list to fit within the predetermined timeframe. The route overview list may be shortened by simply eliminating items from the list or may be shortened based on a plurality of weighting factors. The weighting factors may be based on a popularity ranking of an item contained in the route overview list or on a length of a road section or segment to be traveled on the route. Items contained in the route overview list may have a popularity ranking associated with them such that items having a low popularity ranking are eliminated before items that have a higher popularity ranking. In addition, items contained on short road segments to be traveled may be eliminated before items contained on long road segments. Once the acoustic route overview message has been shortened to fit within the predetermined audio time period, at step 320 the acoustic route overview message is output on the loudspeakers 118.

Figure 4:
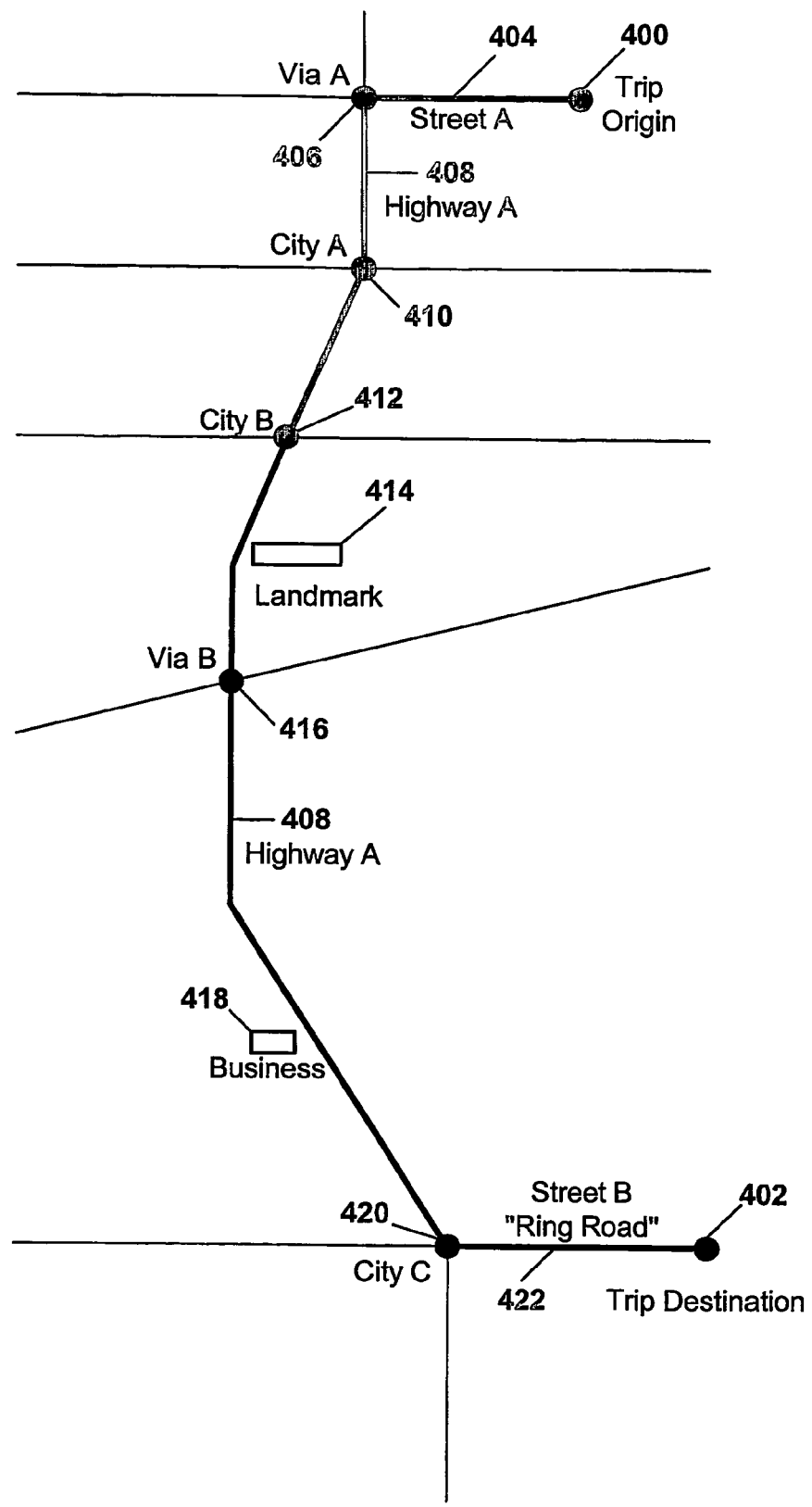
FIG. 4 is an exemplary road network map from a trip origin to a trip destination.

FIG. 4 illustrates an exemplary road network map that represents a route that a vehicle may take to a predetermined destination. The road network map is for illustrative purposes only and should not be construed as a limitation of the present invention. The route includes a trip origin 400 and a trip destination 402. As set forth above, during operation if an occupant of the vehicle requests a route overview the route overview module 212 generates a route overview list. The occupant of the vehicle may request a route overview by pressing a button on the head unit, using voice commands or by using any other type of input device.

The route overview list generated by the route overview module 212 for the route to the trip destination 402 illustrated in FIG. 4 may include the following items: Street A 404, Via A 406, Highway A 408, City A 410, City B 412, Landmark 414, Via B 416, Business 418, City C 420, Street B "Ring Road" 422 and the trip destination 402. Once the route overview list is created by the route overview module 212, the acoustic message module 214 uses the route overview list to create an acoustic route overview message. The acoustic message module 214 uses the items contained in the route overview list to locate audible messages contained within the acoustic message database 108 that are associated with the items contained in the route overview list.

Once the audible messages are located in the acoustic message database, the acoustic message module 214 generates the acoustic route overview message. In the example set forth above, the acoustic message module 214 may create the following acoustic route overview message: "The route to your trip destination goes via Street A to Via A, Highway A through City A and City B, pass Landmark A through Via B, pass Business A to City C, Street B, also known as Ring Road, in City C to your trip destination. Anticipated arrival time: 23 minutes past 12 o'clock." As set forth above, the acoustic route overview message includes the names of streets, highways, vias, landmarks, businesses and alternative road or street names (e.g.—"Ring Road"). The acoustic route overview message may also include an anticipated time of arrival message as well.

The acoustic route overview message may also be shortened by using the weighting factors set forth above. The acoustic route overview message may be shortened so that it will fit within a predetermined timeframe. This would be especially helpful for longer trips that include allot of items in the route overview list. For example, if the acoustic route overview message is shortened based on the popularity rankings of items contained in the route overview list, the vias (Via A 406 and Via B 416) may be eliminated from the acoustic route overview message. If the route overview message is shortened by using the length of road segments as the determining factor, then Street A 404 may be eliminated from the list because it is a relatively short road segment. The longest road segment, which is Highway A 408 in the example set forth above, would likely not be eliminated because it is the longest road segment.

Referring once again to FIGS. 1 and 2, as previously set forth the navigation control unit 102 may be connected with the navigation server 116. During operation the navigation control unit 102 communicates with the navigation server 116 using the wireless access device 114. In this embodiment, the navigation server 116 may include some of the software modules set forth in FIG. 2. As such, some of the computations set forth above would be accomplished on the navigation server 116 and then the data from those computations would be transmitted to the navigation control unit 102 using the wireless access device 114. For example, the route overview module 212 and the acoustic message module 214 may be located on the navigation server 116. The acoustic route overview message that is generated by the acoustic message module 214 would be transmitted to the navigation control unit 102.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed:

1. A navigation system having memory storing instructions in the form of a plurality of modules, the instructions executable on a processor, the modules comprising:
    a route calculation module configured to calculate a route to a predetermined destination;
    a route overview module configured to create a route overview list as a function of the route, the route overview list being a summary or survey of the entire route; and
    an acoustic message module configured to generate at least one acoustic route overview message based on the route overview list, the acoustic route overview message being an audible summary of the route to the predetermined destination;
    where the acoustic message module is further configured to shorten the route overview list based on at least one predetermined weighting factor to fit within a predetermined amount of time; and
    where the acoustic route overview message is limited to the predetermined amount of time.

2. The navigation system of claim 1 where the acoustic route overview message is output on at least one loudspeaker.

3. The navigation system of claim 1 where the acoustic route overview message is output in response to a request for a route overview entered by a user.

4. The navigation system of claim 1 where the route overview list includes at least one item selected from a group of items including a street name on the route, a name of a place on the route, a via on the route, a city on the route, an alternative street name on the route, a business location on the route, and a landmark on the route.

5. The navigation system of claim 1 where the predetermined weighting factor is a function of a popularity ranking associated with each item contained in the route overview list.

6. The navigation system of claim 1 where the predetermined weighting factor is based on a length of a mad segment to be traveled on the route.

7. The navigation system of claim 1 where the acoustic route overview message includes an anticipated time of arrival.

8. The navigation system of claim 1 where the acoustic message module retrieves at least one audio file from an acoustic message database to generate the acoustic route overview message.

9. The navigation system of claim 1, wherein the plurality of modules further comprises a route guidance module configured to generate a road network map including the route calculated by the route calculation module.

10. The navigation system of claim 1 where the predetermined weighting factor is a function of the amount of time to acoustically generate each item contained in the route overview list.

11. A method of generating acoustic route information in a navigation system, comprising the steps of:
    calculating a route to a predetermined destination;
    creating a route overview list based on the route to the predetermined destination, where the route overview list is a summary or survey of the entire route; and
    generating an acoustic route overview message as a function of the route overview list, where the acoustic route overview message is an audible summary of the route to the predetermined destination.

12. The method of claim 11 further comprising the step of audibly reproducing the acoustic route overview message on at least one loudspeaker.

13. The method of claim 11 where the acoustic route overview message is audibly reproduced in response to a request from a user.

14. The method of claim 11 where the route overview list is determined by a route overview module.

15. The method of claim 11 where the route overview list includes at least one item selected from a group of items including a street name on the route, a name of a place on the route, a via on the route, a city on the route, an alternative street name on the route, a business location on the route, and a landmark on the route.

16. The method of claim 11 where the acoustic route overview message is limited to a predetermined amount of time.

17. The method of claim 16 where the route overview list is shortened based on at least one predetermined weighting factor to fit within the predetermined amount of time.

18. The method of claim 17 where the predetermined weighting factor is a function of a popularity ranking associated with each item contained in the route overview list.

19. The method of claim 17 where the predetermined weighting factor is based on a length of a mad segment to be traveled on the route.

20. The navigation system of claim 17 where the predetermined weighting factor is a function of the amount of time to acoustically generate each item contained in the route overview list.

21. The method of claim 11 where the acoustic route overview message includes an anticipated time of arrival.

22. The method of claim 11 where the acoustic route overview message is generated by an acoustic message module.

23. The method of claim 22 where the acoustic message module retrieves at least one audio file from an acoustic message database to generate the acoustic route overview message.

24. A navigation system, comprising:
a navigation server having a memory storing instructions in the form of a plurality of modules, the plurality of modules comprising:
a route calculation module executable by the navigation server and configured to calculate a route to a predetermined destination;
a route overview module executable by the navigation server and configured to create a route overview list based on the route, the route overview list being a summary or survey of the entire route; and
an acoustic message module executable by the navigation server and configured to generate an acoustic route overview message as a function of the route overview list, the acoustic route overview message being an audible summary of the route to the predetermined destination; and
a navigation control unit connected to the navigation server and configured to receive the acoustic route overview message from the navigation server.

25. The navigation system of claim 24 where the navigation control unit is connected with the navigation server by a wireless access device.

26. The navigation system of claim 24 where the route overview list includes at least one item selected from a group of items including a street name on the route, a name of a place on the route, a via on the route, a city on the route, an alternative street name on the route, a business location on the route, and a landmark on the route.

27. The navigation system of claim 24 where the acoustic route overview message is limited to a predetermined amount of time.

28. The navigation system of claim 24 where the acoustic route overview message includes an anticipated time of arrival.

29. The navigation system of claim 24 where the acoustic message module retrieves at least one audio file from an acoustic message database to generate the acoustic route overview message.

30. The navigation system of claim 24 wherein the plurality of modules further comprises a route guidance module configured to generate a road network map including the route calculated by the route calculation module.

31. A method of generating acoustic route information, comprising the steps of:
calculating a route to a predetermined destination with a navigation server;
creating a route overview list based on the calculated route to the predetermined destination with the navigation server, the route overview list being a summary or survey of the entire route;
generating an acoustic route overview message as a function of the route overview list with the navigation server the acoustic route overview message being an audible summary of the route to the predetermined destination; and
transmitted the acoustic route overview message to a navigation control unit.

32. The method of claim 31 where the acoustic route overview message is transmitted to the navigation control unit using a wireless access device.

33. The method of claim 31 further comprising the step of audibly reproducing the acoustic route overview message on at least one loudspeaker.

34. The method of claim 31 where the route overview list includes at least one item selected from a group of hems including a street name on the route, a name of a place on the route, a via on the route, a city on the route, an alternative street name on the route, a business location on the route, and a landmark on the route.

35. The method of claim 31 where the acoustic route overview message is limited to a predetermined amount of time.

36. The method of claim 31 where the acoustic route overview message includes an anticipated time of arrival.

37. The method of claim 31 where the acoustic route overview message is generated by an acoustic message module.

38. The method of claim 37 where the acoustic message module retrieves at least one audio file from an acoustic message database to generate the acoustic route overview message.

* * * * *